United States Patent
Geva et al.

(10) Patent No.: US 8,150,021 B2
(45) Date of Patent: Apr. 3, 2012

(54) PROACTIVE SYSTEM AND METHOD FOR MONITORING AND GUIDANCE OF CALL CENTER AGENT

(75) Inventors: Omer Geva, Hefer (IL); Moshe Avlagon, Hefer (IL); Horav Lapidot, Tel Aviv (IL); Dror Zernik, Haifa (IL)

(73) Assignee: Nice-Systems Ltd., Ra'anana (IL)

( * ) Notice: Subject to any disclaimer, the term of this patent is extended or adjusted under 35 U.S.C. 154(b) by 1187 days.

(21) Appl. No.: 11/592,618

(22) Filed: Nov. 3, 2006

(65) Prior Publication Data

US 2008/0107255 A1 May 8, 2008

(51) Int. Cl.
*H04M 3/00* (2006.01)
*H04M 5/00* (2006.01)
(52) U.S. Cl. ......... 379/265.06; 379/265.01; 379/265.02; 379/265.12
(58) Field of Classification Search ............. 379/265.06, 379/265.01, 265.02, 265.12
See application file for complete search history.

(56) References Cited

U.S. PATENT DOCUMENTS

| | | | | |
|---|---|---|---|---|
| 6,363,145 | B1 * | 3/2002 | Shaffer et al. ............ | 379/265.02 |
| 6,959,080 | B2 * | 10/2005 | Dezonno et al. ......... | 379/265.07 |
| 2005/0043986 | A1 * | 2/2005 | McConnell et al. ............ | 705/11 |
| 2007/0071222 | A1 * | 3/2007 | Flockhart et al. ........ | 379/265.02 |

FOREIGN PATENT DOCUMENTS

WO   WO 02/46872   6/2002

OTHER PUBLICATIONS

Sheff, Harry; Fleischer, Joe; "First Looks/New Technology . . . environment." Call Center Magazine, Feb. 1, 2006, XP002471169, *How Do You Get Coaching and Training to Stick?*.
International Search Report for Corresponding PCT Application (4 pages), Jan. 11, 2007.

* cited by examiner

*Primary Examiner* — Quynh Nguyen
(74) *Attorney, Agent, or Firm* — Pearl Cohen Zedek Latzer, LLP

(57) ABSTRACT

System for enhancing existing quality monitoring tools for monitoring and guiding agent performance within call centers, each of which provided with a plurality of agent terminals, a plurality of agent audio interfaces, and a plurality of software applications. The proposed system comprises a module for quality evaluation of agents skills and/or of compliance with business processes; a database for storing the results of the evaluation module, in the form of a plurality of profiles of performance; a Call Analysis System (CAS) connected to the database and with the software applications, for retrieving the profile of performance associated with an agent and for generating and transmitting a visual or textual or audio input regarding corrective and/or preventive action(s) required during the current interaction, to an agent terminal, based on the performance profile, and/or on acquired real-time call-based information, as defined by predetermined criteria.

15 Claims, 3 Drawing Sheets

SALE call
Compliance Issues
Manipulation of data / Neglect to ask question / Neglect to follow    Y   N   NA
Appropriate offering procedure / Comments / Constraints               Y   N   NA
Customer qualifications                                               Y   N   NA Score: _____

Critical Procedures
Eligibility          Y   N   NA
Customer history     Y   N   NA
Address              Y   N   NA
Date of birth        Y   N   NA
Occupation           Y   N   NA Score: _____

Additional Procedures
Keycode             Y   N   NA
Authorized caller   Y   N   NA
Billing             Y   N   NA
Comments            Y   N   NA
Marital status      Y   N   NA Total Score: _____

Fig. 1 (Prior Art)

PROACTIVE SYSTEM AND METHOD FOR MONITORING AND GUIDANCE OF CALL CENTER AGENT

FIELD OF THE INVENTION

The present invention relates to the field of Customer Relationship Management, and in particular a system and method for relying on monitoring information in order to proactively improve the performance of call center agents in real-time, during the course of a call.

BACKGROUND OF THE INVENTION

Call centers have become a key channel for managing corporation-customer relations. A call center allows for both service and support, as well as for the selling and marketing of the corporate products. Products adapted for use in call centers have become an industry, relying on hardware, such as switch boxes and telephone-computer interfaces, as well as software for managing the interactions between an agent and a customer, e.g. the Customer Relation Management (CRM) software application. The agents in call centers are trained to handle as many calls as possible, while reflecting during a call the corporate goals in terms of product or service quality, needs, standards, and customer understanding. Since a call center is often a large operation, often manned by a large management chain and sometimes operated by a subcontractor, modifying the agents' behavior is a complex and sensitive task: the call center is often perceived as a reflection of the capabilities of a corporation. The currently employed methods to ensure and to improve the performance of an agent rely mostly on recording the conversation for later analysis, or allowing the supervisor to tap into the call in real-time.

In order to evaluate an agent, a Quality Monitoring (QM) team member or supervisor listens to a recording and fills a form. The forms are then analyzed and stored in a QM database. A portion of an exemplary prior art QM system questionnaire is shown in FIG. 1.

Agent performance analysis is also performed in prior art systems by converting the conversation of a call into textual data, and reviewing the converted textual data to determine the occurrence of undesirable categorization, word-spotting, emotional outbursts, or talk patterns. A detailed evaluation form is then filled and stored in a database.

In prior art QM systems, the data stored in the database may be processed in various ways, such as by generating reports per agent, sending update e-mails to management and to agents, and developing a customized training program for overcoming various weak points that were determined in the agent's performance. Thus the processed data provides a feedback to the agent and to his managers. However, the feedback does not have a sufficiently quick response time to influence the performance of an agent in the next call that the agent is conducting. The feedback from QM data spurs a long term educational process by which the agent's call center performance is improved, involving the understanding of points raised in the report sent to the agent and the implementation of these points by practical training, such as by a training seminar conducting by representatives of the organization. Improvement to the performance of the agent invariably cannot be realized in a subsequent call, and cannot be realized as soon as a performance deficiency is detected.

It is an object of the present invention to provide feedback of a sufficiently fast response time from a quality monitoring system to allow the performance of a call center agent to improve at the next call-related occurrence at which the agent encounters the same situation which previously caused a performance deficiency.

It is an additional object of the present invention to augment a quality monitoring system so that the performance of a call center agent will be improved in real-time, during the course of a call conducted with a customer.

It is an additional object of the present invention to provide a proactive quality monitoring system for generating corrective and preventive actions to be taken by a call center agent in real-time, during the course of a call conducted with a customer.

It is an additional object of the present invention to provide a proactive quality monitoring system by which the agent performance in terms of customer retention can be improved.

It is yet an additional object of the present invention to personalize a CRM system per agent using feedback data received from a quality monitoring system.

It is yet an additional object of the present invention to personalize the CRM system per agent using feedback data received from a quality monitoring system in real time and which is dynamically adjusted in response to the performance of the agent.

Other objects and advantages of the invention will become apparent as the description proceeds.

SUMMARY OF THE INVENTION

The present invention is directed to a system for enhancing existing quality monitoring tools for monitoring and guiding agent performance within call centers, each of which provided with a plurality of agent terminals, a plurality of agent audio interfaces, and a plurality of software applications. The proposed system preferably comprises a module for quality evaluation of agents skills and/or of compliance with business processes; storage means for storing the results of the evaluation module, in the form of a plurality of profiles of performance; a Call Analysis System (CAS) being in data communication with the storage means and with the software applications, for retrieving the profile of performance associated with an agent and for generating and transmitting a visual or textual or audio input regarding corrective and/or preventive action(s) required during the current interaction, to an agent terminal, based on the performance profile, and/or on acquired real-time call-based information, as defined by predetermined criteria. The visual or textual or audio input may be generated and transmitted to an agent terminal in real-time during an interaction.

The system may further include recording means for recording interactions of one or more agents with a customer; storage means for storing the interactions and/or their textual representation; and a software application for analyzing the interactions and identifying stages during each interaction.

The system may further include interfacing means for allowing a supervisor to listen to the content of the interactions or to access their textual representation and evaluate them.

The system may further include interface to CRM systems, for improving the performance of agents assisted by the CRM system.

Preferably, the Call Analysis System (CAS) adds indicators to elected interactions, used for tagging the elected interactions or portions thereof. These indicators are stored in relation to the recording database. Tagged records may be used for selection of one or more desired recordings.

Preferably, guiding of the agent's performance is carried out individually and adaptively, by the Call Analysis System (CAS), for each agent by using the evaluation results.

BRIEF DESCRIPTION OF THE DRAWINGS

In the drawings:

FIG. 1 is an illustration of a portion of an exemplary prior art quality monitoring form;

DETAILED DESCRIPTION OF PREFERRED EMBODIMENTS

Figure 2:
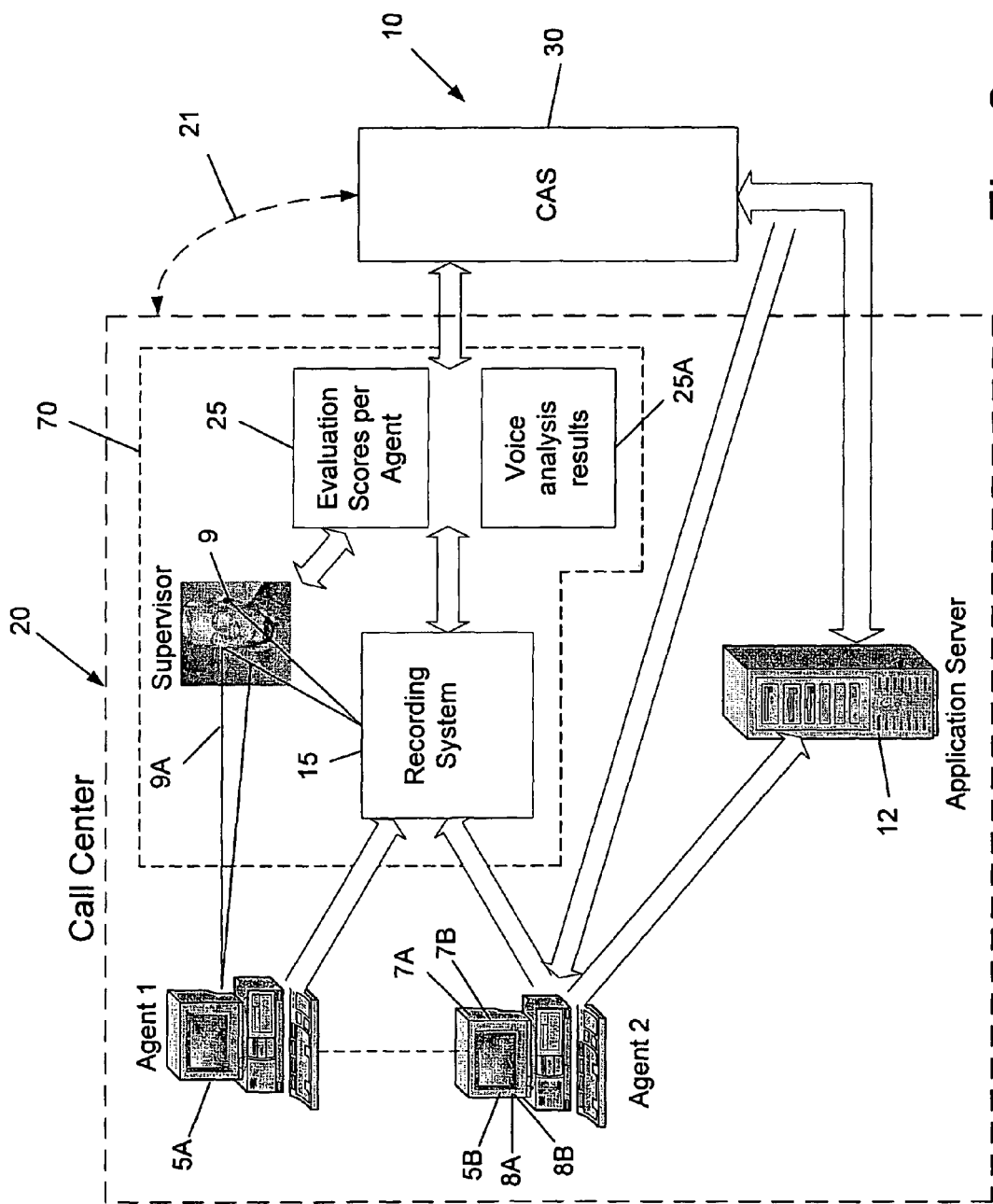
FIG. 2 is a schematic illustration of an agent performance monitoring system, according to one embodiment of the invention.

The present invention provides a proactive system and method for using stored agent performance data, which reflects an agent's performance within a call center, with real-time call-based agent performance information. The agent will be directly and immediately alerted if the real-time performance information indicates that a performance deficiency or even inefficiency have been detected, or if the system predicts that a performance deficiency or inefficiency are liable to result, based on the stored performance data, during the course of a call. Such an alert (hereinafter referred to as either a "corrective action" or "preventive action") will therefore improve the performance of an agent. The system is also capable of acquiring and storing call-related data, for improved analysis of call patterns, agent skills, and business results.

As referred to herein, the term "performance" means the degree to which a call center agent, when interacting with a customer, fulfills the goals set forth by managers of the organization that the agent is representing. These goals typically include efficiency (rapid handling), effectiveness (revenue generation) and quality of service. A "customer" is usually one interacting with an agent who wishes to receive information about, or to buy products or services offered by the organization that sponsors the call center; The communication link between the agent and customer will be referred to as a "call", and can be embodied by an interaction by means of any suitable quick-responding means of communication, such as by a landline or wireless telephone communication network, or by means of a data network, e.g. instant messaging and e-mail messages, and whether initiated by the agent or the customer. When the customer with whom the agent interacts is a potential buyer, the organization goals include clarity and conciseness of speech, effectively addressing the concerns and needs of the customer, and encouraging the customer to purchase the products of, or use the services of, the organization, and the maximization of the revenue generated from this customer. In a service call center such goals typically are a rapid and accurate reply to customer requests and needs. When the customer is a current customer, the goals will also include improving customer satisfaction, typically resulting in increased customer retention.

Selected representatives of the organization, such as supervisors, have monitored the performance of agents in prior art systems by listening to a recording of a call between an agent and a customer, or by listening to the actual call. As a part of the monitoring operation, the representative grades the performance of the agent in the given call with respect to selected performance parameters, and accordingly completes a form. An exemplary prior art quality monitoring (QM) form is illustrated in FIG. 1. Performance parameters are typically grouped into skills for achieving customer rapport, commonly referred to as "soft skills", and skills that are needed to finalize agreements, commonly referred to as "hard skills". Examples of soft skills are friendliness, such as mentioning the customer's name or the customer's birthday date together with congratulatory remarks, in order to convey to him a sense of personal attention. Typical hard skills are compliance with the organization's negotiating guidelines, and verbally summarizing agreement details and charges that are payable.

The performance grades of each agent are stored in a QM database, and an agent can receive from a prior art system an e-mail message that tabulates his performance grades, or a summary of a recommended training program to be undertaken, in order to gradually improve the agent's performance. The transmittal of e-mail messages, the generation of recommended training programs, and other existing feedback methods practiced heretofore in conjunction with prior art QM systems are performed off-line (even when they are electronically delivered), in the sense that they never occur when the agent is still in the interaction, and typically are periodically performed, e.g., by weekly mail or by monthly training. Due the time consuming process of receiving feedback from the performance grades and undergoing training to correct deficiencies, improvement to the performance of the agent cannot be realized in a subsequent call, and cannot be realized as soon as a performance deficiency is detected. Further it leaves the agent alone during the next actual call. The agent has to remember the training actions, rather than being coached on how to improve.

The system of the present invention, in contrast, provides means for guiding the agent during the course of a call. In a QM database, which is similar to that of the prior art, are stored a plurality of performance profiles. A performance profile is the summary of all QM forms that have been completed with respect to the subject of analysis, e.g. a given agent. A performance profile is compared with real-time information that is acquired during a call currently being conducted between an agent and a customer. A Call Analysis System (CAS) retrieves a performance profile from the QM database that is of relevance to the acquired real-time information. A predefined correction rule is also provided to the system. The CAS determines whether a corrective action is needed based on the retrieved performance profile and/or based on the acquired real-time information, as determined by predefined correction rules. When a corrective action is needed, the CAS transmits a suitable signal to the agent, e.g. a visual or audio prompt. For example, the visual prompt may be embodied by a pop-up window which is indicative of the corrective action that needs to be taken. After a pop-up window appears on the monitor of the agent, it may disappear only after the agent intentionally removes the same from the monitor by means of an input device, such as a mouse or keyboard, or after the corrective action has been performed, e.g. the agent entered a required field of the software application. A corrective action need not be an action to be taken by the agent to correct deficient performance; it may be an action predicted by the CAS which will be able to fulfill a given goal. By employing a CAS in data communication with the QM database, a corrective action will be transmitted only to those agents that have demonstrated, as reflected in the corresponding performance profiles, a deficiency with respect to a specific performance parameter.

FIG. 2 illustrates an agent performance proactive monitoring system, which is designated generally by numeral 10, according to one embodiment of the invention. System 10 comprises call center 20, the environment thereof being represented by a square of dashed lines, and CAS 30 in data communication with call center 20. The data communication between call center 20 and CAS 30 allows the performance of an agent to be analyzed in real-time, and thereafter transmitting corrective actions, if needed, to the corresponding agent during the course of the same call with a customer.

Call center 20 comprises a plurality of agent terminals $5_A$, $5_B \ldots 5_N$, a plurality of agent audio interfaces $7_A, 7_B \ldots 7_K$, and call center applications $8_A, 8_B \ldots 8_m$. Call center applications comprises the means well known to those skilled in the art to receive a large volume of calls and to direct each call to a different agent audio interface 7, while preserving all the information about each and every interaction with each customer. The call center typically contains a quality monitoring (QM) system, denoted in numeral 70. Proactive monitoring and guidance system 10 uses the QM database (not shown) in which is stored a plurality of profiles of agent's performance.

Each agent has a corresponding terminal 5 which is provided with software applications adapted to present, enter and store customer information during the course of a call. As the call proceeds, the agent is obliged to enter different predetermined fields of the software application, and to verbalize statements and questions as required by a local law or by the goals of the organization. The information entered in each field has importance in terms of being able to fulfill the goals of the organization by representing a statement or question enunciated by the agent or by representing information received from the customer. All call-related data entered by an agent in a corresponding terminal 5 is received by application server 12. Some or all of the calls are recorded by recording system 15, as a part of the QM 70 system, and may be stored in the QM database Recording system 15 may also be provided with capabilities of storing the indicia which are displayed on each terminal 5 as the corresponding agent enters customer information. CAS 30 is in communication with call center applications 12 or with terminals 5 to monitor possible deficiencies and to guide the agent by proactive corrective and preventive actions. These guidance actions are transmitted in a form of an alert signal to the agent, and possibly also to a supervisor, in accordance with goals of the organization. The most relevant corrective action determined by CAS 30, which may be in the form of a pop-up message on agent terminal 5 or a vocal message, accompanies the alert signal. For example, an alert signal may be generated when a predetermined field was not completed within a predetermined time from the starting time of the call. The corrective action transmitted to the agent will therefore indicate which field has to be entered.

CAS 30 is also able to predict a corrective action that should be taken. Since when a call is routed to a given agent, and since the corresponding agent profile is known to CAS 30, CAS 30 will therefore determine, based on the agent profile, that a corrective or preventive action will be needed at a predetermined call scenario. As referred to herein, a "scenario" is defined as a selected sequence of customer information entered by the agent, application fields viewed by the agent, etc. The agent will therefore receive the corrective action during the course of the call, as a reminder to ask a certain question or to say a certain statement at a selected stage of the call. On the other hand, an agent having improved scores in his profile will not be subject to a corrective action.

In another and preferred embodiment of the invention, CAS 30 is also in communication with voice analysis module 25A, if such a module exists, which is adapted to analyze the audible information enunciated by the agent and customer during the call. This may happen either in real time or based on audio recording system 15. Module 25 may convert the audible information to textual data, and alternatively, may execute emotional feedback or word spotting, which are well known methods of analyzing audible information to those skilled in the art. CAS 30 applies predetermined criteria to the audible information, which is also compared to the agent performance profile. If CAS 30 determined that that the agent is likely to verbalize a performance deficiency, a corrective action alert therefore needs to be generated during the course of a call. A generated corrective action alert is transmitted to the corresponding agent terminal 5, and may also be transmitted to supervisor 9 in the form of feedback data 21, or an immediate alert. Supervisor 9 may be the same supervisor that is in charge of the evaluation, or a different one, responsible for providing live support to the agents.

The following example explains the utility of the present invention. In a bank call center, the agents may be required to mention the name of the customer at least once every minute, and to suggest to the customer to access the website of the bank. The agent is also required to confirm the identity and contact information of a new customer, including the zip code. If management has decided that each new customer is to be offered introductory banking conditions, such as increased interest rates for each new bank account opened, the agent is required to interact with the new customer by a specific business procedure.

During an exemplary monitoring operation, the QM system generates the agents' profiles. The CAS 30 retrieves an agent performance profile which is indicative that a given agent continuously neglects to mention the customer name. The CAS 30 also retrieves a set of rules and target grades which are indicative of a desired agent compliance level for the new-customer procedure. By guiding the agent using the business rules the CAS 30 transmits a corrective action to the given agent that the customer name should be mentioned, e.g., at a predetermined frequency. Agents who did not receive a sufficiently high grade are also reminded to confirm the zip code of the new customer. Unlike in prior art systems, where it was sent by mail, this reminder, is presented in a form of a pop-up window, when the agents interacts with the relevant application, within the given scenario, at the moment that the zip code may be entered. Agents who have complied with these corrective actions several times do not receive additional alert signals, unless they begin to forget it again.

Figure 3:
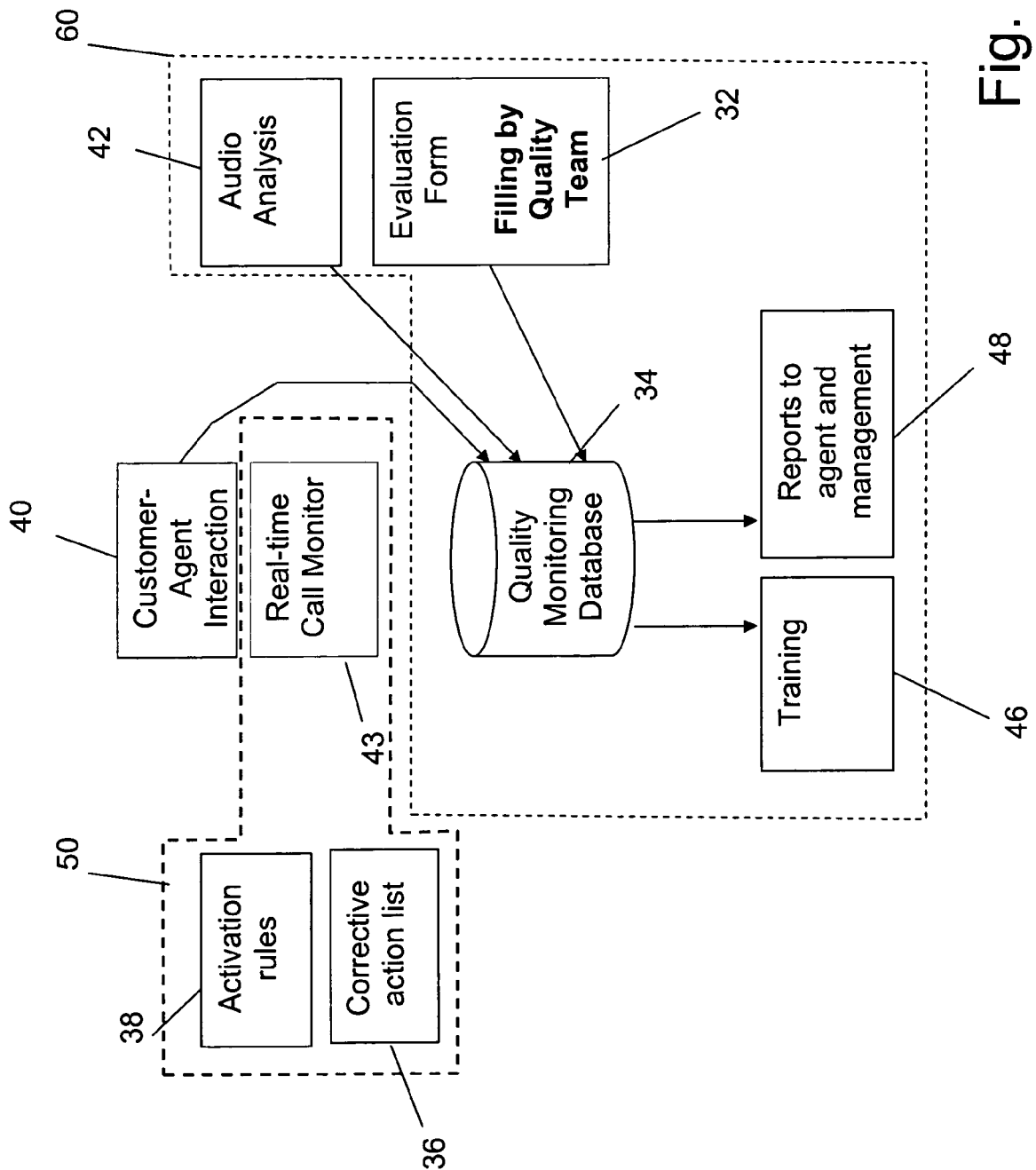
FIG. 3 is a flow diagram of a method for improving agent performance by use of the system of the present invention.

FIG. 3 illustrates a schematic flow diagram of a method for improving agent performance by use of the system of the present invention. In step 32, evaluation forms of a given agent may be completed offline by representatives of a quality assurance group within the organization as conducted by prior art quality monitoring systems 60. Automatic analysis tools may add tags or categorize each recording in the recording database. The data associated with the evaluation forms of each agent, as well as the additional information generated by automatic audio and visual analysis is stored in the QM database 34. In addition an individual agent profile is stored. Later on, when a call is routed to the given agent in step 40, the interaction between the agent and the participant commences. The CAS 43 monitors the performance of the agent, such as when the agent enters relevant fields of the software application during the course of the call. The speech-to-text module analyzes the audible information enunciated by the agent and customer during the call, e.g. converts the audible information to a textual format, executes emotion detection or word spotting, and then transmits the results of speech analysis to the CAS in step 42. The CAS utilizes the acquired real-time data, i.e. the information entered in the fields of the software application and the analyzed conversation data, and the retrieved agent performance profile to generate one or more corrective actions to be taken in step 36. The corrective actions may be conditional and are therefore adaptive in nature, and may be obviated if the agent performance improves. Thus if the given agent complies with the corrective steps, a quality assured call that fulfills the goals of the organization results in step 43.

In another embodiment of the invention, the CAS 50 utilizes analyzed conversation data in order to categorize the call. Relevant categories may be a description of a business process, sales results, or any business information that can be detected from the call and the applications. These categories are added as tags to the QM database 34. By means of the tags, it is possible to retrieve selected tagged calls or predetermined call scenarios, in order to analyze the calls for the determination of marketing and business advantages.

In another embodiment of the invention, the Real time call monitor 43 can trigger the quality monitoring system 60 to start recording an interaction. Such a trigger can be generated, based on activation rules 38, or monitored interaction scenarios.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A system for monitoring and guiding agent performance within call centers, each of which being provided with a plurality of agent terminals, a plurality of agent audio interfaces, and a plurality of software applications, the system comprising:
    a database for storing a plurality of performance profiles, each of said performance profiles being associated with a respective agent of a call center; and
    a Call Analysis System (CAS) that retrieves, in real time, a performance profile of an agent; acquires, in real time, data entered by the agent in one of said agent terminals into a field of a software application during a call; and determines, during the course of the call, whether a corrective action is needed based on the performance profile and the data entered by the agent,
wherein, when the corrective action is needed, the CAS generates and transmits, in real time during the call, input regarding the corrective action.

2. A system according to claim 1, wherein the input is a visual input, a textual input or an audio input.

3. A system according to claim 1, further comprising:
    a recording system for recording interactions of one or more agents with a customer.

4. A system according to claim 3, further comprising interfacing means for allowing a supervisor to listen to the content of the interactions or to access their textual representation and evaluate them.

5. A system according to claim 1, further comprising interface to CRM systems, for improving the performance of agents assisted by said CRM system.

6. A system according to claim 1, in which the Call Analysis System (CAS) adds indicators to elected interactions, used for tagging said elected interactions or portions thereof.

7. A system according to claim 1, further comprising a voice analysis module and wherein the CAS acquires, in real time, results of speech analysis of the call and determines, during the course of the call, whether a corrective action is needed based on results of the speech analysis.

8. A system according to claim 1, wherein the data entered by the agent comprises predetermined fields of the software application.

9. A system according to claim 1, wherein the CAS determines whether a corrective action is needed according to a predefined correction rule.

10. A computer-implemented method for monitoring and guiding agents of call centers, the method comprising:
    retrieving, in real time, by a computer-implemented Call Analysis System (CAS), a performance profile of an agent;
    acquiring, in real time, by the computer-implemented call analysis system, data entered by the agent in an agent terminal into a field of a software application during a call;
    determining, in real time, by the computer-implemented CAS, during the course of the call, whether a corrective action is needed, based on the performance profile and the data entered by the agent;
    generating, in real time during the course of the call, by the computer-implemented CAS, input indicative of the corrective action; and
    transmitting, during the course of the call, by the computer-implemented CAS, a corrective action alert that includes the input to the agent terminal.

11. The method of claim 10, wherein the performance profile of the agent is a summary of a plurality of quality monitoring forms related to the agent.

12. The method of claim 10, wherein the data entered by the agent comprises predetermined fields of the software application.

13. The method of claim 10, wherein determining whether a corrective action is needed is performed according to a predefined correction rule provided to the computer-implemented CAS.

14. The method of claim 10, wherein the corrective action alert is a visual input, a textual input or an audio input.

15. The method of claim 10 comprising:
    analyzing, by a voice analysis module, audible information enunciated during the course of the call; and
    acquiring, in real time, by the computer-implemented CAS, results of speech analysis of the call performed by the voice analysis module; and
    determining, by the computer-implemented CAS, in real time during the course of the call, whether a corrective action is needed based on the performance profile and the results of speech analysis.

* * * * *

UNITED STATES PATENT AND TRADEMARK OFFICE
CERTIFICATE OF CORRECTION

PATENT NO. : 8,150,021 B2
APPLICATION NO. : 11/592618
DATED : April 3, 2012
INVENTOR(S) : Omer Geva et al.

It is certified that error appears in the above-identified patent and that said Letters Patent is hereby corrected as shown below:

Title Page: Item 75 should read

Omer Geva, Hefer (IL); Moshe Avlagon, Hefer (IL); Hovav Lapidot, Tel Aviv (IL); Dror Zernik, Haifa (IL)

Signed and Sealed this
Twenty-third Day of June, 2015

Michelle K. Lee
*Director of the United States Patent and Trademark Office*